(12) United States Patent
Shinohara

(10) Patent No.: US 7,911,714 B2
(45) Date of Patent: Mar. 22, 2011

(54) IMAGING LENS AND IMAGING APPARATUS USING IMAGING LENS

(75) Inventor: Yoshikazu Shinohara, Saitama (JP)

(73) Assignee: Fujinon Corporation, Saitama-shi (JP)

(*) Notice: Subject to any disclaimer, the term of this patent is extended or adjusted under 35 U.S.C. 154(b) by 88 days.

(21) Appl. No.: 12/501,034

(22) Filed: Jul. 10, 2009

(65) Prior Publication Data

US 2010/0007970 A1 Jan. 14, 2010

(30) Foreign Application Priority Data

Jul. 11, 2008 (JP) ............................... P2008-180933

(51) Int. Cl.
*G02B 9/34* (2006.01)
(52) U.S. Cl. ......... 359/774; 359/773; 359/772; 359/771
(58) Field of Classification Search .................. 359/766, 359/787, 757, 686, 790, 765, 795, 779, 791, 359/793, 784, 785, 771–774

See application file for complete search history.

(56) References Cited

U.S. PATENT DOCUMENTS

| 2007/0081259 A1 | 4/2007 | Noda |
| 2010/0134903 A1* | 6/2010 | Hirao et al. .................. 359/738 |

FOREIGN PATENT DOCUMENTS

| EP | 1 742 094 A1 | 1/2007 |
| EP | 1 821 129 A1 | 8/2007 |
| JP | 2005-539276 A | 12/2005 |
| JP | 3946245 B1 | 7/2007 |
| WO | WO-2004/027880 A2 | 4/2004 |
| WO | WO-2008/075469 A1 | 6/2008 |

* cited by examiner

*Primary Examiner* — Timothy J Thompson
(74) *Attorney, Agent, or Firm* — Birch, Stewart, Kolasch & Birch, LLP

(57) ABSTRACT

Disclosed is an imaging lens having both high heat resistance that enables the imaging lens to be mounted on a printed circuit board by a reflow mounting method and a high optical performance. The imaging lens includes: a first positive lens group; a second negative lens group; a third positive lens group; and a fourth positive or negative lens group. Each of the first to fourth lens groups includes a parallel plane glass plate and a resin lens that has heat resistance and is arranged on the parallel plane glass plate so as to be integrated with the parallel plane glass plate.

8 Claims, 1 Drawing Sheet

FIGURE
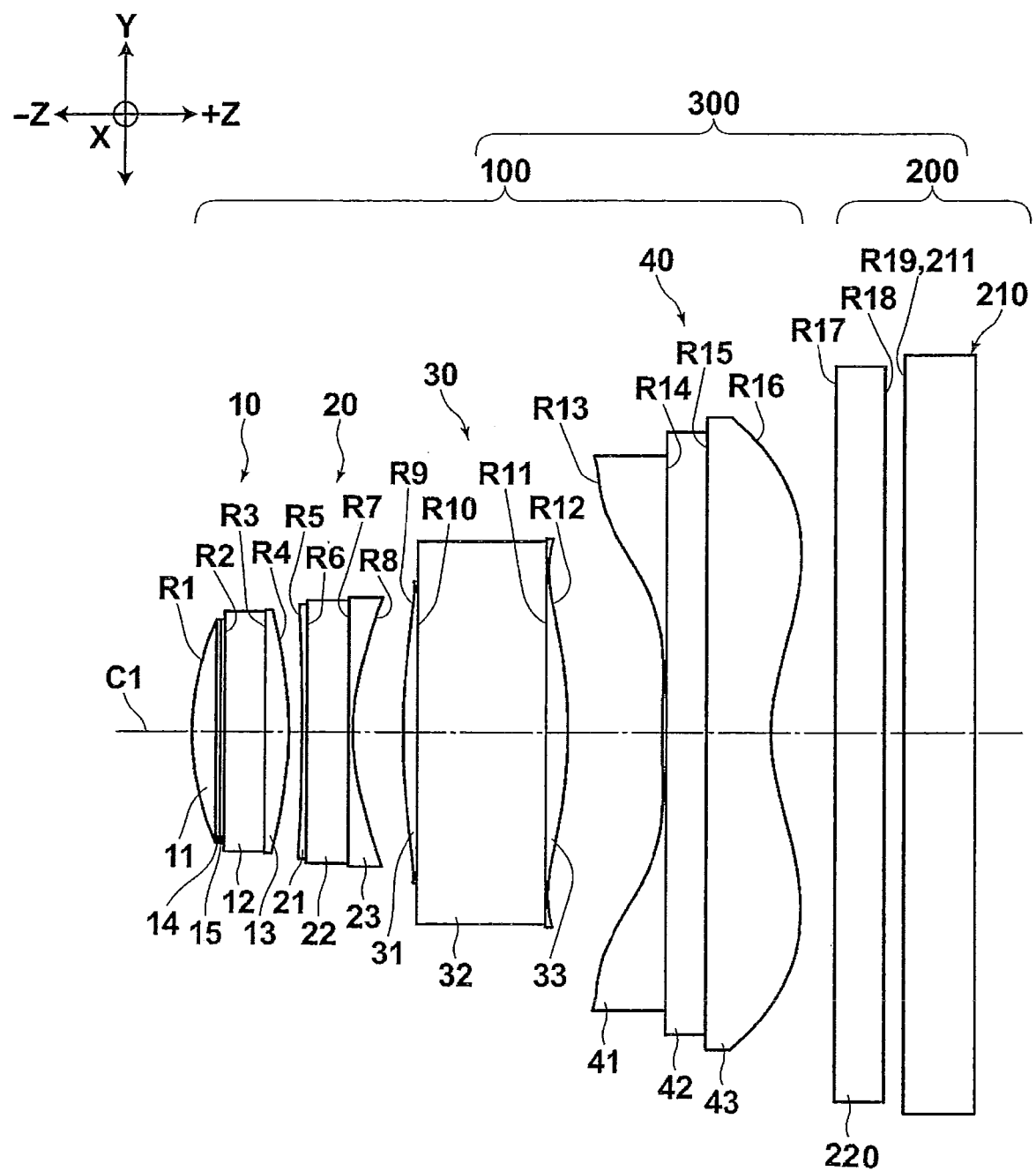

IMAGING LENS AND IMAGING APPARATUS USING IMAGING LENS

CROSS-REFERENCE TO RELATED APPLICATIONS

This application is based upon and claims the benefit of priority from the Japanese Patent Application No. 2008-180933 filed on Jul. 11, 2008; the entire contents of which are incorporated herein by reference.

BACKGROUND OF THE INVENTION

1. Field of the Invention

The present invention relates to an imaging lens and an imaging apparatus using the imaging lens.

2. Description of the Related Art

Mobile phones have been proposed which include imaging apparatuses each having an imaging lens and an imaging device that converts an optical image formed by the imaging lens into electric signals. The imaging apparatus is mounted on a printed circuit board provided in the mobile phone. In addition, a reflow mounting method has been known as a method of mounting the imaging apparatus on the printed circuit board. In the reflow mounting method, solder balls are arranged on the printed circuit board at positions where the imaging apparatus is mounted in advance, the imaging apparatus is arranged on the solder balls, and the imaging apparatus is heated to melt the solder balls and then cooled down. In this way, the imaging apparatus is soldered to the printed circuit board.

The imaging lens provided in the imaging apparatus mounted by the reflow mounting method needs to have heat resistance. Therefore, an imaging lens having a structure that is different from that of the imaging lens used in a normal environment has been examined.

For example, as an imaging lens that has heat resistance and can be mounted by the reflow mounting method, an imaging lens has been proposed which includes three lens groups each having a cemented lens obtained by bonding glass and a resin having heat resistance to be integrated with each other (see Japanese Patent No. 3946245 and JP-T-2005-539276 (corresponding to WO-A-2004/027880)). The imaging lens having three lens groups is used to form the optical image of a subject on a light receiving surface of an imaging device having, for example, two mega pixels each having a size of about 5 μm×5 μm.

However, there is a demand for a high-quality camera provided in a mobile phone. Specifically, there is a demand for a high-performance imaging lens applicable to an imaging device having a light receiving surface including two mega pixels or more. For example, there is a demand for the reflow mounting of an imaging apparatus, which is a combination of an imaging device having a light receiving surface including five mega pixels, each having a size of about 2 μm×2 μm, and a high-performance imaging lens having a high resolution corresponding to the imaging device, on a printed circuit board.

However, in the imaging lens including three lens groups, each having the cemented lens with heat resistance that is obtained by bonding the glass and the resin to be integrated with each other, it is difficult to further improve the optical performance thereof.

The above-mention problems arise in the imaging lens of the imaging apparatus mounted on the printed circuit board by the reflow mounting method as well as the imaging lens provided in the mobile phone.

SUMMARY OF THE INVENTION

The invention has been made in order to solve the above-mentioned problems, and an object of the invention is to provide an imaging lens that has both heat resistance and a high optical performance and can be mounted on a printed circuit board by a reflow mounting method, and an imaging apparatus using the imaging lens.

According to an aspect of the invention, an imaging lens includes: a first positive lens group in which a lens surface closest to an object side is a convex surface; a second negative lens group in which a lens surface closest to an image side is a concave surface; a third positive lens group in which a lens surface closest to the image side is a convex surface; and a fourth positive or negative lens group in which a lens surface closest to the image side is a concave surface. The first to fourth lens groups are arranged in this order from the object side. Each of the first to fourth lens groups includes a parallel plane glass plate and a resin lens that has heat resistance and is arranged on the parallel plane glass plate so as to be integrated with the parallel plane glass plate.

The first lens group or the second lens group may include a stop. The first lens group or the second lens group including the stop may include a filter having an infrared cut function.

Any filter having an infrared cut function may be used as long as it has an optical characteristic that shields at least infrared light and transmits visible light. The filter having the infrared cut function may be a thin film or an optical member that absorbs infrared light.

The imaging lens may satisfy the following conditional expression:

$$0 < Tmp/Tmg < 1,$$

where Tmp indicates the average value of the thicknesses of the centers of all of the resin lenses in the first to fourth lens groups, and Tmg indicates the average value of the thicknesses of all of the parallel plane glass plates in the first to fourth lens groups.

The second lens group may satisfy the following conditional expression:

$$\nu dg - \nu dp > 15,$$

where $\nu dp$ indicates the Abbe number of the resin lens with respect to the d-line, and $\nu dg$ indicates the Abbe number of the parallel plane glass plate with respect to the d-line. It is more preferable that the second lens group satisfy the following conditional expression:

$$\nu dg - \nu dp > 25.$$

According to another aspect of the invention, an imaging apparatus includes: the imaging lens; and an imaging device that converts an optical image formed by the imaging lens into electric signals.

The term 'convex lens surface' means that the center of the lens surface is convex. In addition, the term 'concave lens surface' means that the center of the lens surface is concave.

The term 'resin lens having heat resistance' means a resin lens having heat resistance that enables reflow mounting. Specifically, it is preferable that the resin lens have a heat resistance of 120° C. or more, and it is more preferable that the resin lens have a heat resistance of 160° C. or more.

The resin lens may be made of a thermosetting resin material.

The lens group may be formed by arranging resin lenses having heat resistance on both sides of a parallel plane glass plate and integrating them, or it may be formed by arranging the resin lens having heat resistance on only one side of the parallel plane glass plate and integrating them.

The lens group may be formed by directly bonding a parallel plane glass plate and a resin lens having heat resistance, or it may be formed by arranging another optical member between the parallel plane glass plate and the resin lens having heat resistance.

The lens group having the aperture diaphragm arranged therein may be formed by arranging an optical filter and the aperture diaphragm between the parallel plane glass plate and the resin lens and bonding them.

It is preferable that the optical filter be formed by coating a thin film on the parallel plane glass plate.

The aperture diaphragm may be formed by coating a thin film on the parallel plane glass plate, or it may be a thin plate made of, for example, a metal material.

According to the imaging lens and the imaging apparatus using the imaging lens of the invention, each of the first to fourth lens groups is obtained by integrating a parallel plane glass plate with a resin lens having heat resistance provided on the parallel plane glass plate. Therefore, it is possible to obtain both high heat resistance and a high optical performance.

That is, since the imaging lens includes four lens groups, it is possible to improve an optical performance, as compared to the imaging lens including three lens groups according to the related art. In addition, since each of the four lens groups is formed by arranging the resin lens having heat resistance on the parallel plane glass plate and integrating them, it is possible to obtain a lens having heat resistance that enables reflow mounting.

Further, since the first lens group or the second lens group includes the stop arranged therein, it is possible to dispose an exit pupil at a position that is away from the light receiving surface to the object side. Therefore, when beams for forming an optical image on the light receiving surface are incident on the imaging lens, it is possible to reduce the incident angle of the beams. As a result, it is possible to improve so-called telecentricity.

When infrared light traveling through an optical path to the light receiving surface is incident on the filter having an infrared cut function, it is possible to reduce the incident angle of the light by arranging the stop and the filter having the infrared cut function in the same lens group. Therefore, it is possible to more reliably shield the infrared light traveling through the optical path to the light receiving surface. As a result, it is possible to more reliably reduce the amount of infrared light received by the light receiving surface.

When the imaging lens satisfies the following Conditional expression 1; $0<Tmp/Tmg<1$, it is possible to increase the thickness of parallel plane glass plates used, which have a heat resistance that is higher than that of the resin lens. Therefore, it is possible to reduce the deformation of the imaging lens or a variation in the optical properties of the imaging lens due to a temperature variation. As a result, it is possible to increase the heat resistance of the imaging lens.

When the second lens group satisfies the following Conditional expression 2; $vdg-vdp>15$, it is possible to more accurately correct chromatic aberration occurring in the imaging lens.

BRIEF DESCRIPTION OF THE DRAWINGS

The FIGURE is a side view schematically illustrating the structure of an imaging lens and an imaging apparatus according to an embodiment of the invention.

DESCRIPTION OF THE PREFERRED EMBODIMENTS

Hereinafter, exemplary embodiments of the invention will be described with reference to the accompanying drawings. The FIGURE is a cross-sectional view illustrating an example of an imaging apparatus provided with an imaging lens according to an embodiment of the invention.

An imaging apparatus 300 shown in the FIGURE includes an imaging lens 100 and an imaging unit 200.

The imaging lens 100 includes a first lens group 10 having a positive power in which a lens surface closest to an object side is a convex surface on an optical axis, a second lens group 20 having a negative power in which a lens surface closest to an image side is a concave surface on the optical axis, a third lens group 30 having a positive power in which a lens surface closest to the image side is a convex surface on the optical axis, a fourth lens group 40 having a positive or negative power in which a lens surface closest to the image side is a concave surface on the optical axis. The first to fourth lens groups are arranged in this order from the object side.

Each of the first lens group 10, the second lens group 20, the third lens group 30, and the fourth lens group 40 includes a cemented lens obtained by integrating a parallel plane glass plate with a resin lens that has heat resistance and is laminated on the parallel plane glass plate.

The first lens group 10 includes a resin lens 11 having heat resistance, an aperture diaphragm 14, an infrared cut filter 15, which is a filter having an infrared cut function, a parallel plane glass plate 12, and a resin lens 13 having heat resistance laminated in this order from the object side, which are integrated with each other.

The parallel plane glass plate 12 is a parallel plane plate made of a transparent glass material.

The infrared cut filter 15 is formed by coating a thin film on the surface of the parallel plane glass plate 12.

The aperture diaphragm 14 is formed by providing an aperture in a thin film that is made of a metal material. The aperture diaphragm 14 is adhered onto the infrared cut filter 15 formed on the surface of the parallel plane glass plate 12 and is integrated with the parallel plane glass plate 12.

The resin lens 11 is formed by radiating ultraviolet rays onto an ultraviolet-curable resin arranged on the infrared cut filter 15 that is formed on the surface of the parallel plane glass plate 12 to cure the ultraviolet-curable resin. Specifically, the resin lens 11 is formed by curing the ultraviolet-curable resin arranged in the range from the infrared cut filter 15 to the aperture diaphragm 14 to be integrated with the parallel plane glass plate 12.

The resin lens 13 is also formed by radiating ultraviolet rays onto an ultraviolet-curable resin arranged on the parallel plane glass plate 12 to cure the ultraviolet-curable resin, and is integrated with the parallel plane glass plate 12.

An object-side lens surface R1 of the resin lens 11, which is a lens surface of the first lens group 10 closest to the object side, is a convex surface on an optical axis C1.

The second lens group 20 includes a resin lens 21 having heat resistance, a parallel plane glass plate 22, and a resin lens 23 having heat resistance arranged in this order from the object side, which are integrated with each other.

The resin lens 21 is formed by radiating ultraviolet rays onto an ultraviolet-curable resin arranged on the surface of the parallel plane glass plate 22 to cure the ultraviolet-curable resin, and is integrated with the parallel plane glass plate 22.

The resin lens 23 is also formed by radiating ultraviolet rays onto an ultraviolet-curable resin arranged on the parallel plane glass plate 22 to cure the ultraviolet-curable resin, and is integrated with the parallel plane glass plate 22.

An image-side lens surface R8 of the resin lens 23, which is a lens surface of the second lens group 20 closest to the image side, is a concave surface on the optical axis C1.

Similarly, the third lens group 30 includes a resin lens 31 having heat resistance, a parallel plane glass plate 32, and a resin lens 33 having heat resistance laminated in this order from the object side, which are integrated with each other.

The resin lens 31 is formed by radiating ultraviolet rays onto an ultraviolet-curable resin on the surface of the parallel plane glass plate 32 to cure the ultraviolet-curable resin, and is integrated with the parallel plane glass plate 32. The resin lens 33 is formed by radiating ultraviolet rays onto an ultraviolet-curable resin arranged on the surface of the parallel plane glass plate 32 to cure the ultraviolet-curable resin, and is integrated with the parallel plane glass plate 32.

An image-side lens surface R12 of the resin lens 33, which is a lens surface of the third lens group 30 closest to the image side, is a convex surface on the optical axis C1.

Similarly, the fourth lens group 40 includes a resin lens 41 having heat resistance, a parallel plane glass plate 42, and a resin lens 43 having heat resistance laminated in this order from the object side, which are integrated with each other.

The resin lens 41 is formed by radiating ultraviolet rays onto an ultraviolet-curable resin on the surface of the parallel plane glass plate 42 to cure the ultraviolet-curable resin, and is integrated with the parallel plane glass plate 42. The resin lens 43 is formed by radiating ultraviolet rays onto an ultraviolet-curable resin arranged on the surface of the parallel plane glass plate 42 to cure the ultraviolet-curable resin, and is integrated with the parallel plane glass plate 42.

An image-side lens surface R16 of the resin lens 43, which is a lens surface of the fourth lens group 40 closest to the image side, is a concave surface on the optical axis C1.

The imaging unit 200 includes an imaging device 210 having a light receiving surface 211 that detects the optical image of a subject formed by the imaging lens 100 and a cover glass 220 that protects the light receiving surface 211.

Next, for example, numerical data of the imaging lens according to this embodiment of the invention will be described with reference to Tables 1 to 5.

TABLE 1

|  | Ri (mm) | Di (mm) | Ndj | νdj |
|---|---|---|---|---|
| R1 | 1.64 | 0.20 | 1.4800 | 60.0 |
| R2 | 0.00 | 0.25 | 1.5231 | 54.5 |
| R3 | 0.00 | 0.15 | 1.4800 | 60.0 |
| R4 | −2.06 | 0.08 | 1.0000 |  |
| R5 | −17.20 | 0.03 | 1.5800 | 34.0 |
| R6 | 0.00 | 0.25 | 1.5231 | 54.5 |
| R7 | 0.00 | 0.03 | 1.5800 | 34.0 |
| R8 | 1.37 | 0.31 | 1.0000 |  |
| R9 | 3.70 | 0.09 | 1.4800 | 60.0 |
| R10 | 0.00 | 0.79 | 1.5231 | 54.5 |
| R11 | 0.00 | 0.14 | 1.4800 | 60.0 |
| R12 | −3.57 | 0.59 | 1.0000 |  |
| R13 | 4.92 | 0.03 | 1.4800 | 60.0 |
| R14 | 0.00 | 0.25 | 1.5231 | 54.5 |
| R15 | 0.00 | 0.39 | 1.4800 | 60.0 |
| R16 | 1.23 | 0.40 | 1.0000 |  |
| R17 | 0.00 | 0.30 | 1.5163 | 64.1 |
| R18 | 0.00 | 0.12 | 1.0000 |  |
| R19 (imaging surface) | 0.00 | 0.00 | 1.0000 |  |

TABLE 2

| Surface number | K | A4 | A5 | A6 | A7 | A8 | A9 | A10 |
|---|---|---|---|---|---|---|---|---|
| R1 | −1.23E+01 | 3.19E−01 | 6.97E−02 | −1.10E−01 | −1.23E+00 | −5.73E−01 | 5.59E+00 | −4.36E+00 |
| R4 | −2.32E+01 | −2.84E−02 | 1.05E−01 | −2.18E−03 | −2.96E−01 | −9.45E−02 | 2.38E−01 | 1.00E−01 |
| R5 | −1.41E+01 | 1.07E−01 | −3.92E−01 | 4.46E−01 | 7.17E−02 | −8.54E−01 | 5.01E−01 | 2.74E−01 |
| R8 | −9.94E+00 | 2.24E−01 | −4.43E−01 | 2.32E−01 | 2.80E−01 | −2.17E−01 | −4.88E−01 | 4.94E−01 |
| R9 | −5.31E+01 | 1.94E−02 | 6.36E−02 | −8.54E−02 | −9.53E−02 | 9.45E−02 | 1.95E−01 | −2.17E−01 |
| R12 | 2.00E+00 | −7.68E−02 | 6.80E−02 | −1.86E−02 | 2.18E−02 | 4.36E−02 | 2.37E−02 | −3.57E−02 |
| R13 | 6.86E+00 | −4.09E−01 | 3.61E−02 | 6.59E−02 | 6.84E−02 | −1.88E−02 | −6.09E−03 | −1.45E−03 |
| R16 | −8.21E−01 | −4.48E−01 | 3.64E−01 | −7.46E−02 | −3.87E−02 | 9.35E−03 | 7.95E−03 | −2.60E−03 |

TABLE 3

| Focal length (mm) | |
|---|---|
| fall | 3.67E+00 |
| f1 | 2.00E+00 |
| f2 | −2.16E+00 |
| f3 | 3.95E+00 |
| f4 | −3.60E+00 |
| Ratio of focal length | |
| fall/f1 | 1.83E+00 |
| fall/f3 | 9.29E−01 |
| f1/f3 | 5.07E−01 |
| f2/f4 | 5.99E−01 |
| f2/fall | −5.88E−01 |
| f1/fall | 5.46E−01 |

TABLE 4

| Lens group | Kind | Thickness (mm) |
|---|---|---|
| First lens group | Thickness of resin lens 11: T11 | 0.203 |
|  | Thickness of parallel plane plate 12: T12 | 0.250 |
|  | Thickness of resin lens 13: T13 | 0.147 |
| Second lens group | Thickness of resin lens 21: T21 | 0.030 |
|  | Thickness of parallel plane plate 22: T22 | 0.253 |
|  | Thickness of resin lens 23: T23 | 0.025 |
| Third lens group | Thickness of resin lens 31: T31 | 0.093 |
|  | Thickness of parallel plane plate 32: T32 | 0.793 |
|  | Thickness of resin lens 33: T33 | 0.135 |

TABLE 4-continued

| Fourth lens group | Thickness of resin lens 41: T41 | 0.025 |
| --- | --- | --- |
| | Thickness of parallel plane plate 42: T42 | 0.250 |
| | Thickness of resin lens 43: T43 | 0.395 |

| Item | Value |
| --- | --- |
| Average thickness of all resin lenses: Tmp (mm) | 0.132 |
| Average thickness of all parallel plane plates: Tmg (mm) | 0.387 |
| Ratio: Hpg = Tmp/Tmg | 0.341 |

TABLE 5

| Item | Value |
| --- | --- |
| Abbe number: vdg (parallel plane plate) | 54.5 |
| Abbe number: vdp (resin lens) | 34.0 |
| Difference: vs = vdg − vdp | 20.5 |

Table 1 shows lens data of the imaging lens. That is, Table 1 shows data related to the lenses and the parallel plane glass plate in each of the lens groups.

Table 1 includes the surface numbers of the parallel plane glass plates and the resin lenses, the surface number of the cover glass, and the surface number of the imaging surface (or the light receiving surface of the imaging device), but does not include data of the aperture diaphragm 14 and the infrared cut filter 15. Since the thickness of a coating film, which is the infrared cut filter 15, is very small, it is neglected. A bonding surface between the parallel plane glass plate and the resin lens is represented by one surface number.

Table 2 shows the values of coefficients K, A3, A4, A5, ... in an aspheric expression indicating the shape of a curved lens surface of each resin lens (aspheric shape). In Table 1, the meaning of Ri (i=1, 4, ...) will be described below.

Each aspheric surface is defined by the following aspheric expression:

$$Z = \frac{Y^2/R}{1 + (1 - K \cdot Y^2/R^2)^{1/2}} + \sum_{i=4}^{10} AiY^i, \quad \text{[Expression 1]}$$

(where Z: the depth of an aspheric surface (the length of a perpendicular line that drops from a point on the aspheric surface at a height Y to a plane vertical to the optical axis that is tangent to the top of the aspheric surface) (mm), Y: height (the distance from the optical axis) (mm), R: a paraxial curvature radius (mm), Ai: an aspheric coefficient (i=4 to 10), and K: a conic constant).

In Tables 1 and 2, the surface number of an optical member, such as a lens, is represented as an i-th (i=1, 2, 3, ...) surface number that is sequentially increased from the object side to the image side. In the lens data, Ri (i=1, 2, 3, ...) corresponds to Ri (i=1, 2, 3, ...) indicating the lens surface in the FIGURE.

In Table 1, Ri indicates the paraxial curvature radius of an i-th (i=1, 2, 3, ...) surface, and Di (i=1, 2, 3, ...) indicates the surface spacing between the i-th surface and an (i+1)-th surface on the optical axis C1. In addition, the unit of each of the paraxial curvature radius and the surface spacing is millimeter (mm). When the lens surface is convex toward the object side, the paraxial curvature radius thereof has a positive value. When the lens surface is convex toward the image side, the paraxial curvature radius thereof has a negative value.

In addition, Ndj indicates the refractive index of a j-th (j=1, 2, 3, ...) optical component with respect to the d-line (wavelength: 587.6 nm). In this case, the number of the optical component is sequentially increased from the object side to the image side. In addition, vdj indicates the Abbe number of the j-th optical component with respect to the d-line.

Table 3 shows the focal length Fall of the entire imaging lens system, focal lengths f1, f2, f3, and f4, respectively corresponding to the first to fourth lens groups, and the ratio between two of the focal lengths (for example, Fall/f1, Fall/f3, ...).

Table 4 shows the thicknesses T11, T21, T31, and T41 of the centers of the object-side resin lenses in the first to fourth lens groups, the thicknesses T12, T22, T32, and T42 of the parallel plane glass plates in the first to fourth lens groups, the thicknesses T13, T23, T33, and T43 of the centers of the image-side resin lenses in the first to fourth lens groups, the average value Tmp of the thicknesses of the centers of all resin lenses in the entire imaging lens system, the average value Tmg of the thicknesses of the parallel plane glass plates in the entire imaging lens system, and the ratio Hpg of the average value of the thicknesses of all of the resin lenses to the average value of the thicknesses of all of the parallel plane glass plates (Hpg=Tmp/Tmg).

In this embodiment, the ratio Hpg is about 0.34, and satisfies Conditional expression 1; 0<(Tmp/Tmg)<1. It is possible to form an imaging lens having high heat resistance by increasing the number of parallel plane glass plates having little variation in size or physical property even when a temperature variation occurs. Therefore, it is preferable that the ratio Hpg be low.

Table 5 shows the Abbe number vdg of the parallel plane glass plate with respect to the d-line, the Abbe number vdp of the resin lens with respect to the d-line, and the difference vs between the Abbe number vdg and the Abbe number vdp (vs=vdg−vdp) in the second lens group. In this embodiment, the difference vs is 20.5. Therefore, the difference satisfies Conditional expression 2; vs=vdg−vdp>15.

The imaging device according to this embodiment of the invention is not necessarily limited to the structure in which the imaging lens is formed so as to satisfy Conditional expression 1 or Conditional expression 2.

In addition, the material forming the resin lens is not limited to the ultraviolet-curable resin, but any resin material may be used as long as it has heat resistance enabling reflow mounting.

Further, the position of the aperture diaphragm 14 is not limited to the above-mentioned position, but the aperture diaphragm 14 may be disposed at any position. It is preferable that the aperture diaphragm 14 be arranged in the first lens group 10 or the second lens group 20. In this case, it is possible to dispose an exit pupil at a position that is away from the light receiving surface. In this way, when light is incident on the imaging lens 100 to form an optical image on the light receiving surface, it is possible to reduce the incident angle of light. Therefore, it is possible to improve so-called telecentricity.

Further, when infrared light traveling through an optical path to the light receiving surface is incident on the infrared cut filter, it is possible to reduce the incident angle of the light by arranging the aperture diaphragm and the infrared cut filter in the same group. Therefore, it is possible to effectively shield infrared light.

In the above-described embodiment, the lens group including the resin lenses formed on both sides of the parallel plane glass plate is used, but the invention is not limited thereto. A lens group including a resin lens formed on only one side of the parallel plane glass plate may be used to form an imaging lens.

As described above, according to the invention, it is possible to obtain a high-performance imaging lens having high heat resistance, and an imaging apparatus including the imaging lens and an imaging device. In addition, the imaging lens or the imaging apparatus can be mounted on a printed circuit board by a reflow mounting method. Specifically, the imaging lens or the imaging apparatus can be provided in a mobile phone.

The invention is not limited to the above-described embodiment, but various modifications and changes of the invention can be made without departing from the scope and spirit of the invention. For example, the optical characteristics of the lenses, the curvature radii of the lens surfaces, and the surface spacing are not limited to the above-mentioned numerical values, but they may have other values.

What is claimed is:

1. An imaging lens comprising:
    a first positive lens group in which a lens surface closest to an object side is a convex surface;
    a second negative lens group in which a lens surface closest to an image side is a concave surface;
    a third positive lens group in which a lens surface closest to the image side is a convex surface; and
    a fourth positive or negative lens group in which a lens surface closest to the image side is a concave surface,
    wherein the first to fourth lens groups are arranged in this order from the object side,
    each of the first to fourth lens groups includes a parallel plane glass plate and a resin lens that has heat resistance and is arranged on the parallel plane glass plate so as to be integrated with the parallel plane glass plate.

2. The imaging lens according to claim 1, wherein the first lens group includes a stop.

3. The imaging lens according to claim 1, wherein the second lens group includes a stop.

4. The imaging lens according to claim 2, wherein the lens group including the stop includes a filter having an infrared cut function.

5. The imaging lens according to claim 3, wherein the lens group including the stop includes a filter having an infrared cut function.

6. The imaging lens according to claim 1, wherein the imaging lens satisfies the following conditional expression:

$$0 < Tmp/Tmg < 1,$$

where Tmp indicates the average value of the thicknesses of the centers of all of the resin lenses in the first to fourth lens groups, and Tmg indicates the average value of the thicknesses of all of the parallel plane glass plates in the first to fourth lens groups.

7. The imaging lens according to claim 1, wherein the second lens group satisfies the following conditional expression:

$$vdg - vdp > 15$$

where vdp indicates the Abbe number of the resin lens with respect to the d-line, and vdg indicates the Abbe number of the parallel plane glass plate with respect to the d-line.

8. An imaging apparatus comprising:
    the imaging lens according to claim 1; and
    an imaging device that converts an optical image formed by the imaging lens into electric signals.

* * * * *